United States Patent
Lang et al.

(10) Patent No.: US 11,698,998 B2
(45) Date of Patent: Jul. 11, 2023

(54) COMPUTER AIDED DESIGN (CAD) MODEL CONNECTION PROPAGATION

(71) Applicant: Autodesk, Inc., San Francisco, CA (US)

(72) Inventors: Catalin Stefan Lang, Bucharest (RO); Casandra Ioana Radu, Cracow (PL)

(73) Assignee: AUTODESK, INC., San Francisco, CA (US)

( * ) Notice: Subject to any disclaimer, the term of this patent is extended or adjusted under 35 U.S.C. 154(b) by 225 days.

(21) Appl. No.: 16/828,005

(22) Filed: Mar. 24, 2020

(65) Prior Publication Data
US 2021/0303744 A1    Sep. 30, 2021

(51) Int. Cl.
G06G 7/48 (2006.01)
G06F 30/12 (2020.01)
G06F 111/20 (2020.01)

(52) U.S. Cl.
CPC .......... *G06F 30/12* (2020.01); *G06F 2111/20* (2020.01)

(58) Field of Classification Search
CPC .............................. G06F 30/12; G06F 2111/20
See application file for complete search history.

(56) References Cited

U.S. PATENT DOCUMENTS

2011/0270586 A1* 11/2011 Diguet .................... G06T 19/20
703/1

OTHER PUBLICATIONS

Banfi, F., Stephen Fai, and R. Brumana. "BIM automation: advanced modeling generative process for complex structures." 26th International CIPA Symposium on Digital Workflows for Heritage Conservation 2017. Copernicus GmbH, 2017.*
Advance Steel Tutorial. Accessed at http://www.graitec.info/Common/Downloads/Documentation/AS-Tutorial-2013-EN-Metric.pdf. 2013.*
AdvanceSteelImplentationGuide. Mar. 10, 2018.*
Autodesk Advance Steel 2018 Starting Guide.*
Eastman, Chuck, et al. "Automatic rule-based checking of building designs." Automation in construction 18.8 (2009): 1011-1033.*
"Configure Quick Connections", Apr. 9, 2019, https://knowledge.autodesk.com/support/advance-steel/learn-explore/caas/CloudHelp/cloudhelp/2020/ENU/AdvSteel-3Dmodeling/files/GUID-9F13BF93-6056-4535-A477-843389E91E52-htm.html, pp. 1-10.
"Quick Connection Filters", Apr. 9, 2019, https://knowledge.autodesk.com/support/advance-steel/learn-explore/caas/CloudHelp/cloudhelp/2020/ENU/AdvSteel-3Dmodeling/files/GUID-9E3961AC-2B0C-4008-B336-3382E0F23914-htm.html, pp. 1-8.

(Continued)

*Primary Examiner* — Rehana Perveen
*Assistant Examiner* — Nithya J. Moll
(74) *Attorney, Agent, or Firm* — Gates & Cooper LLP

(57) ABSTRACT

A method and system provide the ability to propagate object connections. A three-dimensional (3D) model (that has 3D object components) is acquired. Two or more of the 3D object components are selected as input elements. A connection between the input elements is defined and selected. Data is autonomously collected from the selected connection. The data includes a number of the input elements, a section type of the input elements, and a relative geometrical position between the input elements. A rule autonomously created based on the data. The 3D model is autonomously searched based on the rule to identify other instances of other 3D object components that are consistent with the data. The connection is then autonomously propagated to the identified other 3D object components.

20 Claims, 8 Drawing Sheets

(56) References Cited

OTHER PUBLICATIONS

"Quick Connections", Apr. 9, 2019, https://knowledge.autodesk.com/support/advance-steel/learn-explore/caas/CloudHelp/cloudhelp/2020/ENU/AdvSteel-3Dmodeling/files/GUID-55FD2735-9AA6-4119-8F87-38D7924C8C39-htm.html, pp. 1-8.

"Quick Connections: The Connection Rule Tab", Apr. 9, 2019, https://knowledge.autodesk.com/support/advance-steel/learn-explore/caas/CloudHelp/cloudhelp/2020/ENU/AdvSteel-3Dmodeling/files/GUID-E5548E45-CED5-46B1-8B35-8A55BA91D9E5-htm.html, pp. 1-14.

"Quick Connections: The Default Settings Tab", Apr. 9, 2019, https://knowledge.autodesk.com/support/advance-steel/learn-explore/caas/CloudHelp/cloudhelp/2020/ENU/AdvSteel-3Dmodeling/files/GUID-B8522B73-4B9E-4133-9C20-1D3514F00293-htm.html, pp. 1-9.

"Transfer a Quick Connection", Apr. 9, 2019, https://knowledge.autodesk.com/support/advance-steel/learn-explore/caas/CloudHelp/cloudhelp/2020/ENU/AdvSteel-3Dmodeling/files/GUID-231F7771-B56F-478A-9C38-549893930AFF-htm.html, pp. 1-8.

\* cited by examiner

COMPUTER AIDED DESIGN (CAD) MODEL CONNECTION PROPAGATION

BACKGROUND OF THE INVENTION

1. Field of the Invention

The present invention relates generally to computer aided design (CAD) models, and in particular, to a method, apparatus, system, and article of manufacture for propagating a connection (between model objects) to similar intersecting model objects within a model.

2. Description of the Related Art

In computer aided design (CAD) modeling applications, a design project often has the same or similar intersections between object model components. For example, a bridge design project may have multiple steel beams (girders) that intersect with multiple columns (piers). To define the connection at one of the intersections, the CAD designer selects particular object model components at that intersection (e.g., a particular girder and pier) and defines a particular connection for the selected object model components. To repeat that defined connection at another intersection of similar components, the CAD designer is required to copy the defined connection, manually select the other intersection, and then paste the connection at the selected intersection. The CAD designer must then repeat the copy, select, and paste for every remaining intersection desired. Alternatively, the CAD designer can manually repeat the connection definition process at every manually identified intersection. Either manual process is both inefficient and time consuming. To better understand the problems with the prior art, a description of the prior art connection definition process may be useful.

In a structural project (e.g., a steel project), there are two "classic" workflows to replicate a connection in all applicable cases. In a first workflow, a designer manually searches all situations in which a certain connection with a specific configuration can be applied. At every found situation, the designer either (1) copies and pastes a defined connection, or (2) defines a new connection.

In a second prior art workflow, the designer manually defines a set of rules based on which a connection can be assigned to a specific situation. However, such functionality is difficult to use even for very simple cases because the user is required to understand each case situation, geometry, position, etc., then know how to define the rule (e.g., in a dialog, using a standalone visual logic programming environment such as AUTODESK DYNAMO's programming environment, etc.), then to manually search and associate the created cases based on the parameters. The second prior art workflow (e.g., utilized by the AUTODESK QUICKCONNECTOIN or AUTODESK AUTOCONNECTION features), also includes many limitations.

In an exemplary prior art system that utilizes the second workflow (e.g., the AUTODESK QUICKCONNECTION workflow), limitations include that the user is required to: (a) select connection elements each time a connection is created or is copied (i.e., even if the connection is created from scratch or using a copy tool), (b) manually (or using filters) identify new input elements; and (c) manually identify a selection order for input elements. In another exemplary prior art workflow (e.g., the AUTODESK AUTOCONNECTION workflow), limitations include that a designer (a) configures a connection/connection rules without seeing the input; (b) selects inputs in a very general manner during the application of the connection rules; and (c) must define a group connection one-by-one in order to edit the group connection later. In addition, prior art secondary workflows often require the user to configure and manage the inputs/rules via a text/table-based user interface of a large database (e.g., by manually editing: connection parameters; section type definitions; geometrical restrictions; connections; selection order of input elements; and/or the rule group, model role, and connection zone definition).

Accordingly, the prior art fails to provide a mechanism to quickly and efficiently automatically search/find (in a project design) applicable intersections/cases, and replicate a defined connection to/on the applicable intersections/cases. In view of the above, it is desirable to provide a mechanism that automates the connection design process across all of the remaining same/similar intersections in a design project.

SUMMARY OF THE INVENTION

Embodiments of the invention overcome the problems of the prior art using a propagation tool that recreates a case in the exact same cases in the rest of a project based on parameters gathered from an initial case, with no other/additional user input. In this regard, while prior art workflows require designers (e.g., steel detailers) to spend an inordinate amount of time replicating a case in all application situations from a project, embodiments of the invention provide a propagation tool that saves a lot of time for the designer in this process (e.g., between 25-85% of the time spent for modeling).

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention overcome the problems of the prior art by recreating a case (e.g., a steel connection) in the exact same situations in the rest of the project based on the parameters gathered from the initial case with no other user input.

To recreate the case, a rule is defined from an already created and configured connection (that the user creates anyway to understand the specificity of a situation). In this regard, starting from the first case (instance), the tool reads the parameters of the situation and creates a rule. The rule is used to search the whole project for identical situations and creates/recreates that specific connection with its specific configuration for each one.

Propagation Logical Flow

Figure 1:
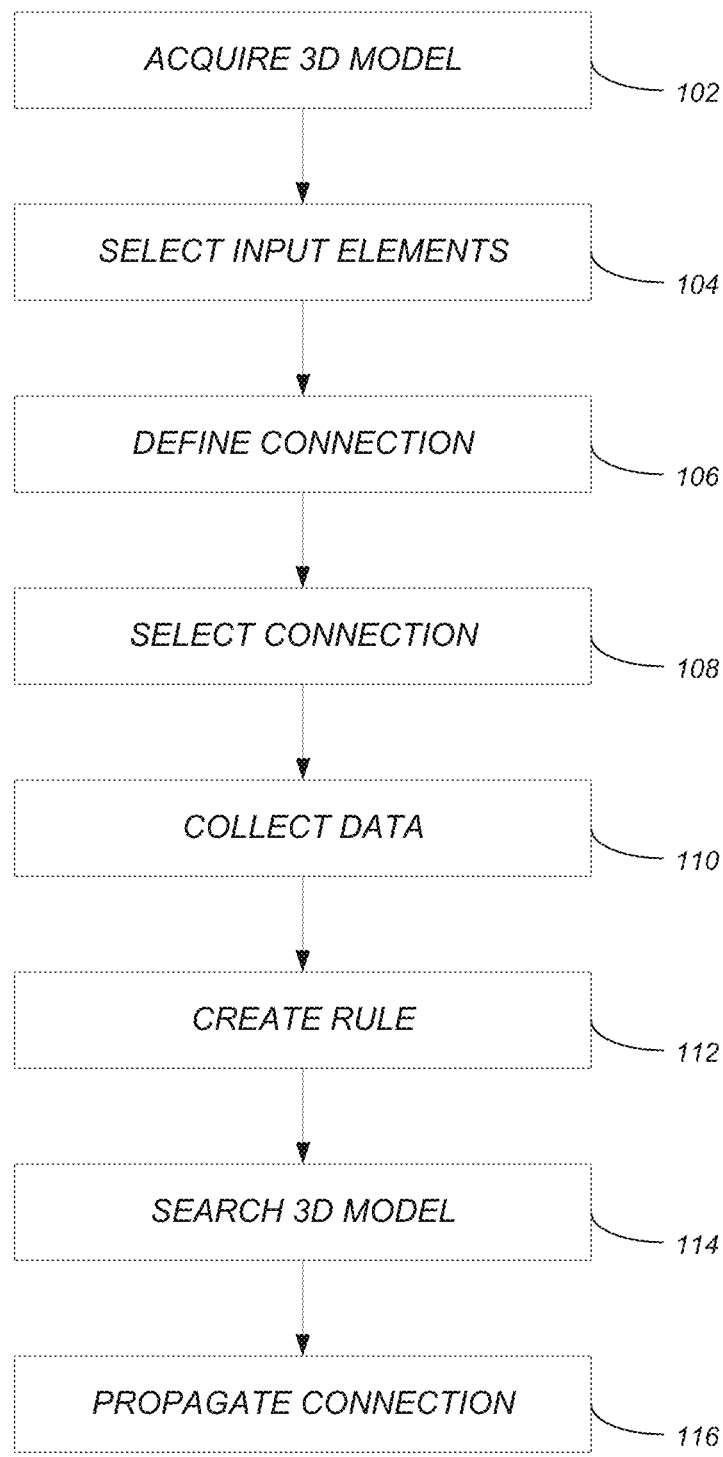
FIG. 1 illustrates the logical flow for propagating object connections in accordance with one or more embodiments of the invention.

FIG. 1 illustrates the logical flow for propagating object connections in accordance with one or more embodiments of the invention.

At step 102, a three-dimensional (3D) model including 3D object components is acquired.

At step 104, two or more of the 3D object components are selected as input elements.

Figure 2A:
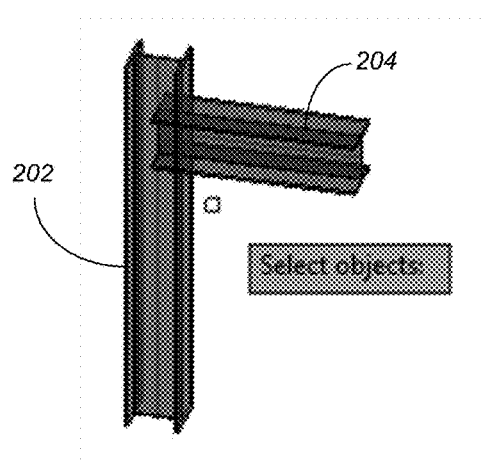
FIGS. 2A-2E illustrate an exemplary selection of input elements and the defining/creating of a connection in accordance with one or more embodiments of the invention.
Figure 2B:
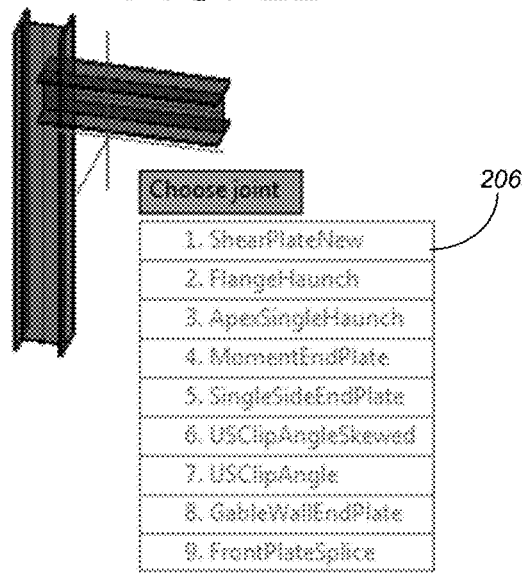
Figure 2C:
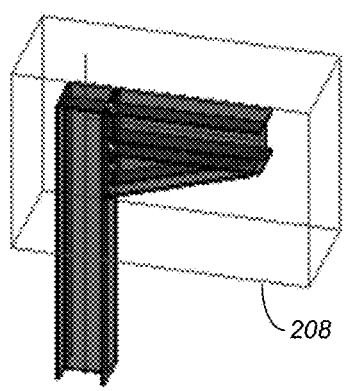
Figure 2D:
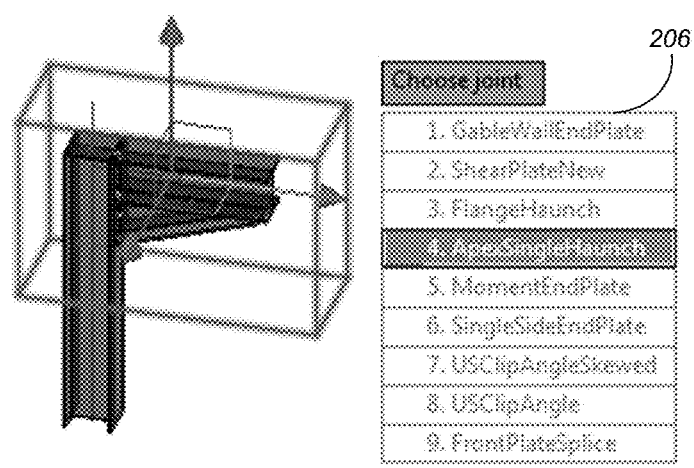
Figure 2E:
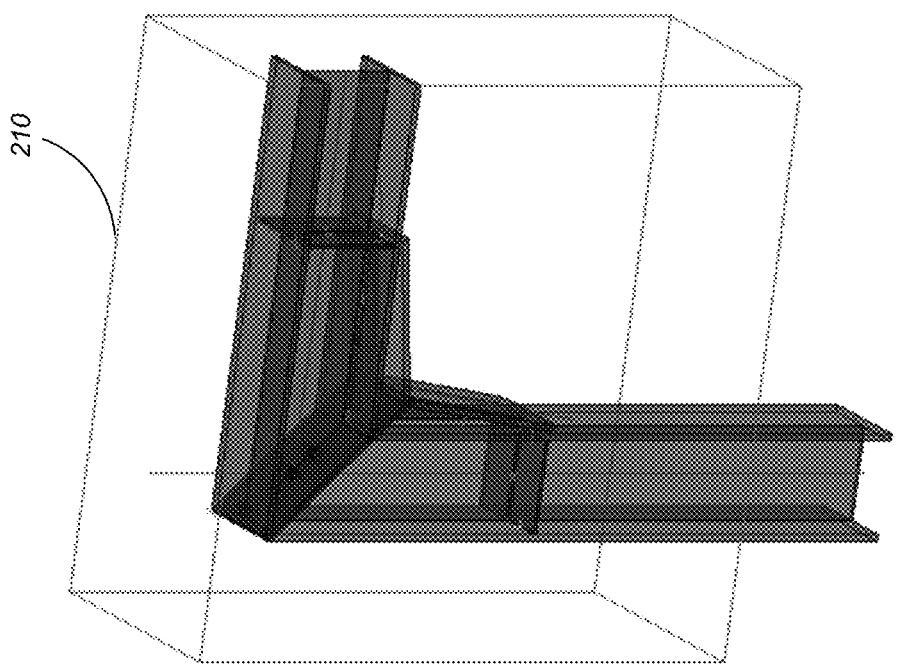
Figure 2E:
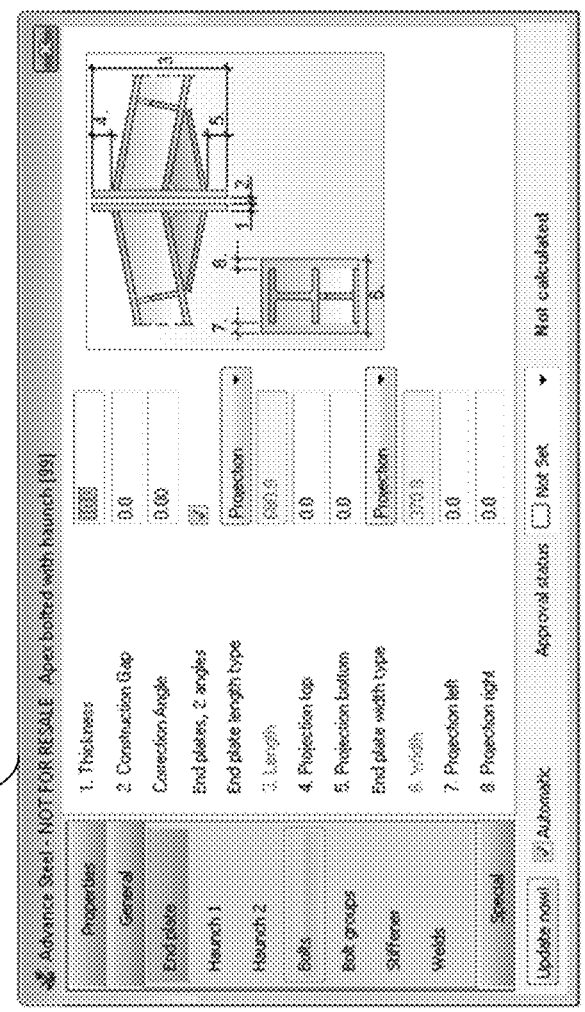

At step 106 a connection between the input elements is defined. FIGS. 2A-2E illustrate an exemplary selection of input elements (step 104) and the defining/creating of a connection (step 106) in accordance with one or more embodiments of the invention (e.g., in the AUTODESK ADVANCE STEEL application). In FIG. 2A, objects 202-204 are selected as the input elements. In FIG. 2B, a choose joint dialog box 206 allows the user to select the joint/connection for the input elements 202-204. FIG. 2C illustrates a created joint/connection 208. FIG. 2D illustrates the use of the dialog box 206 to change the connection/joint type. FIG. 2E illustrates the changed created joint connection 210 and a parameter dialog box 212 that may be used to further specify the parameters of the connection/joint 210.

At step 108, the connection is selected.

At step 110, data is autonomously collected from the selected connection. The data includes: (i) a number of the input elements; (ii) a section type of the input elements; and (iii) a relative geometrical position between the input elements. As used herein, the term "autonomously" is consistent with the common definition of the term in that actions performed autonomously are performed automatically and without additional input/interaction with the user. For example, structural steel is a category of steel used for making construction materials in a variety of shapes. Many structural steel shapes take the form of an elongated beam having a profile of a specific cross section. This specific cross section profile is called the section type (examples: I, T, C, Z, Tube, L, etc.). The relative geometrical position between the input elements may include the connection location zone (e.g., element start/end or middle), the flange/web position (e.g., two main components can be defined for many section types: the horizontal elements are flanges, and the vertical element is the web; the web resists shear forces, while the flanges resist most of the bending moment experienced by the beam), the angle between the input elements (the angle formed by the longitudinal axes of each group of two elements that are input for the connection), and/or the alignment of the input elements (e.g. connected elements' webs are parallel).

The collected data may further include a structural type of each of the input elements (e.g., a model role of each of the input elements). In one or more embodiments, such a model role may be selected from a group consisting of a beam and a column.

At step 112, a rule is autonomously created based on the data.

At step 114, the 3D model is autonomously searched based on the rule to identify one or more other instances of other 3D object components that are consistent with the data. In one or more embodiments, the search may be limited to/may only search elements visible in a current view of the 3D model. In other words, the search is only conducted with respect to a current view of the model (not what is currently displayed on the screen but the defined view for the model).

At step 116, the connection is autonomously created between the identified other 3D object components. In other words, the connection is propagated to the identified other 3D object components consistent with the parameters established in the rule. Step 116 may further include the propagation of additional changes to the model. For example, all of the identified instances may be autonomously grouped together into a defined group. Thereafter, when a a parameter of one of the instances in the group is changed, the changed parameter is propagated to all of the instances in the group. Alternatively, or in addition, a master instance of the identified instances, as well as slave instances (of the master instance) may be autonomously identified. Thereafter, when a parameter of the master instance is changed, the changed parameter is autonomously propagated to the slave instances.

Figure 3:
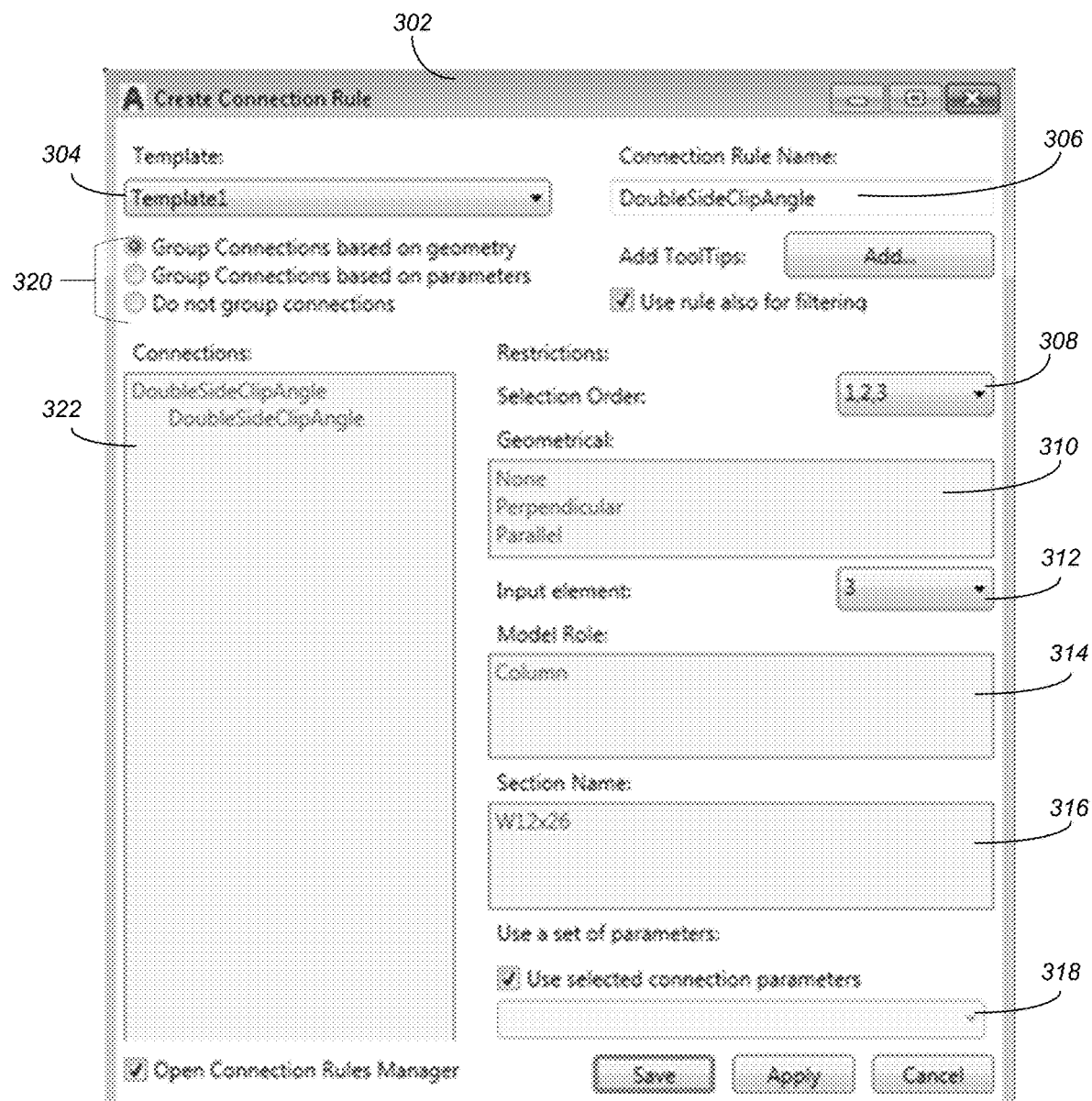
FIG. 3 illustrates an exemplary connection rule that has been created in accordance with one or more embodiments of the invention.

FIG. 3 illustrates an exemplary connection rule that has been created in accordance with one or more embodiments of the invention. As illustrated, the dialog box 302 is merely used herein for illustration of the various parameters/components of a connection rule and is not used to actually create the rule. In this regard, embodiments of the invention provide for the autonomous creation of the connection rule (i.e., without user interaction/intervention). Further, the dialog box 302 may be used to edit the rule subsequent to creation and use during the propagation (if desired). The template selection 304 is used to select a template that can be used to apply a set of connection rules together. The connection rule name 306 provides the name of the rule and is auto-populated (e.g., based on a defined naming convention).

The selection order 308 specifies the various order/permutations between the input elements. Further, the geometrical restrictions 310 that are listed may change based on the selection order 308. The geometrical restrictions 310 specifies the geometric restrictions of an element relative to other input elements (e.g., none, perpendicular, parallel, etc.) (i.e., it defines the relative geometrical position). The input element 312 specifies the particular input element number that is being defined in the dialog box 302 (the input element is represented by its number of orders in the selection). The model role 314 is the model role of the input element identified by the input element number 312 (e.g., the structural type such as column). Section name 316 specifies the section name/type of the input element identified by the input element number 312. The connection parameters 318 determines which parameters are to be used (e.g., the created connection parameters or another set of connection parameters from a database). Group connections 320 provides an option to group the created connections based on geometry, based on parameters, or not to group the connections. Connection area 322 identifies the group or master/slave connections.

Figure 4A:
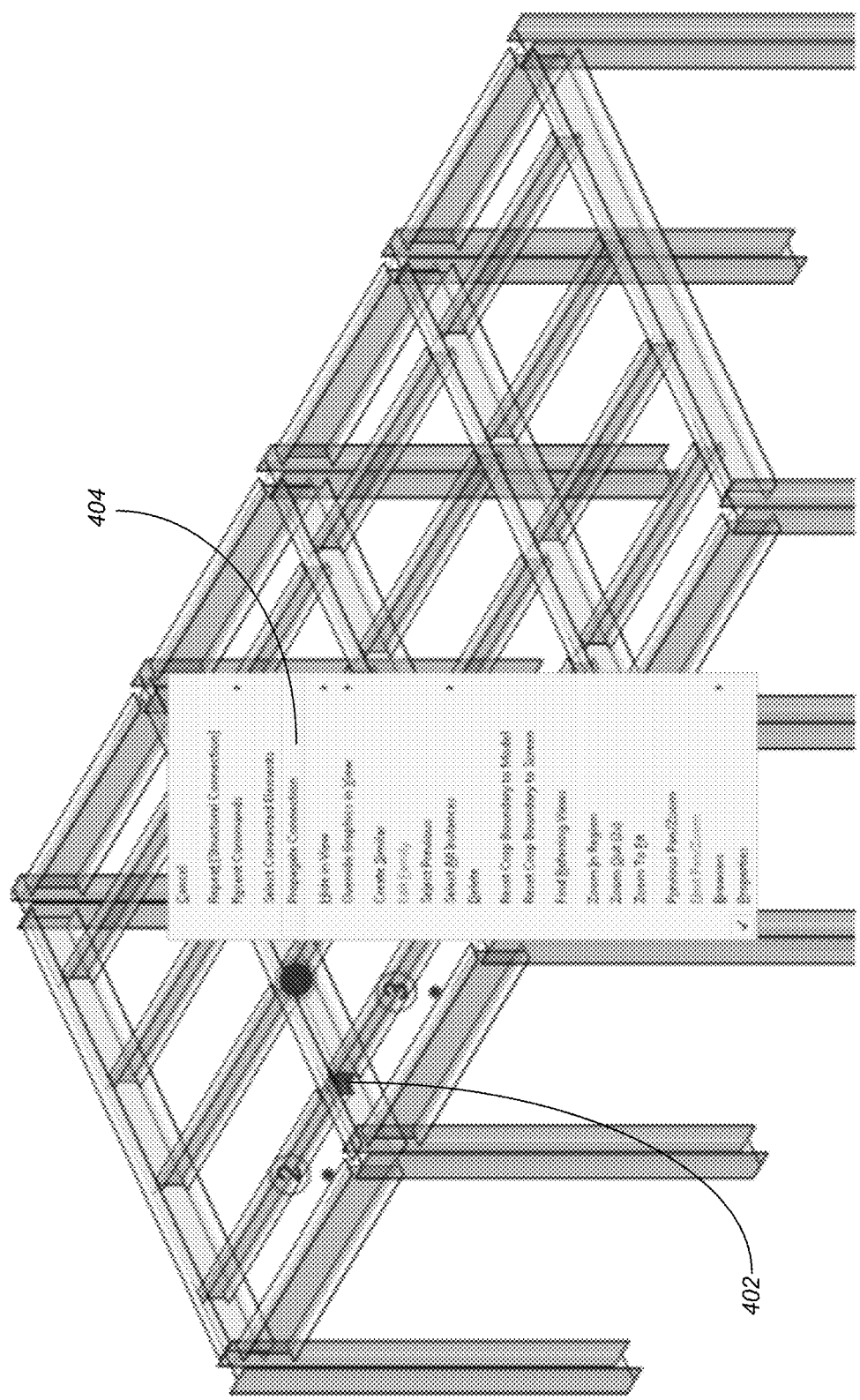
FIGS. 4A and 4B illustrate an exemplary connection propagation on a model in accordance with one or more embodiments of the invention.
Figure 4B:
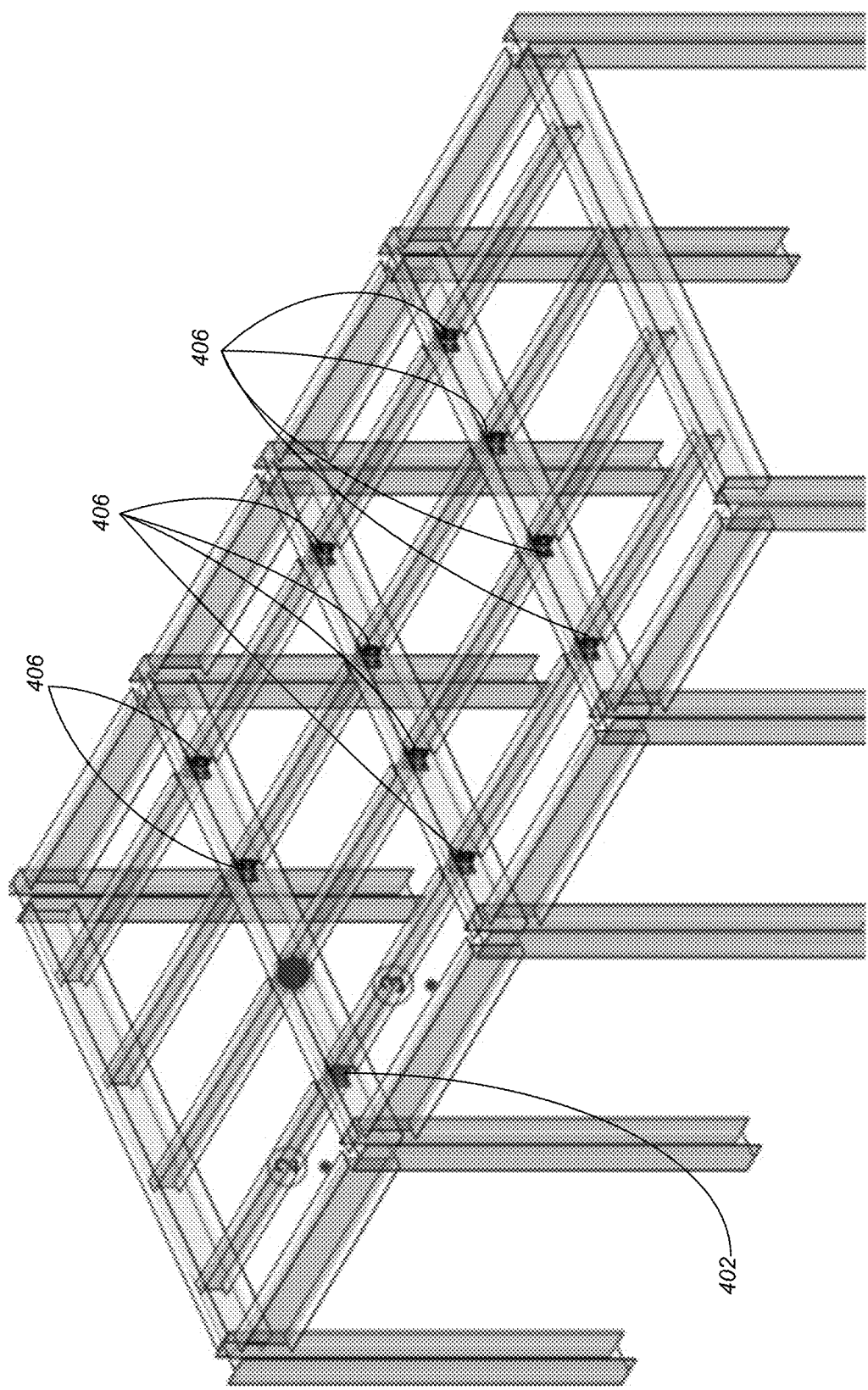

FIGS. 4A and 4B illustrate an exemplary connection propagation on a model in accordance with one or more embodiments of the invention. In FIG. 4A, the connection 402 is selected (e.g., with the numbers "2" and "3" indicating the input elements), and the user has selected the option 404 to propagate the connection 402 (e.g., by selecting the connection 402, clicking a right mouse button to display the dialog window, and selecting the menu option 404). FIG. 404 illustrates the propagation resulting in the propagation of the connection/joint 402 to identical/similar instances of the input elements thereby resulting in connections/joints 406. In this regard, the selected connection 402 is applied everywhere in the model where an identical context is found.

Hardware Environment

Figure 5:
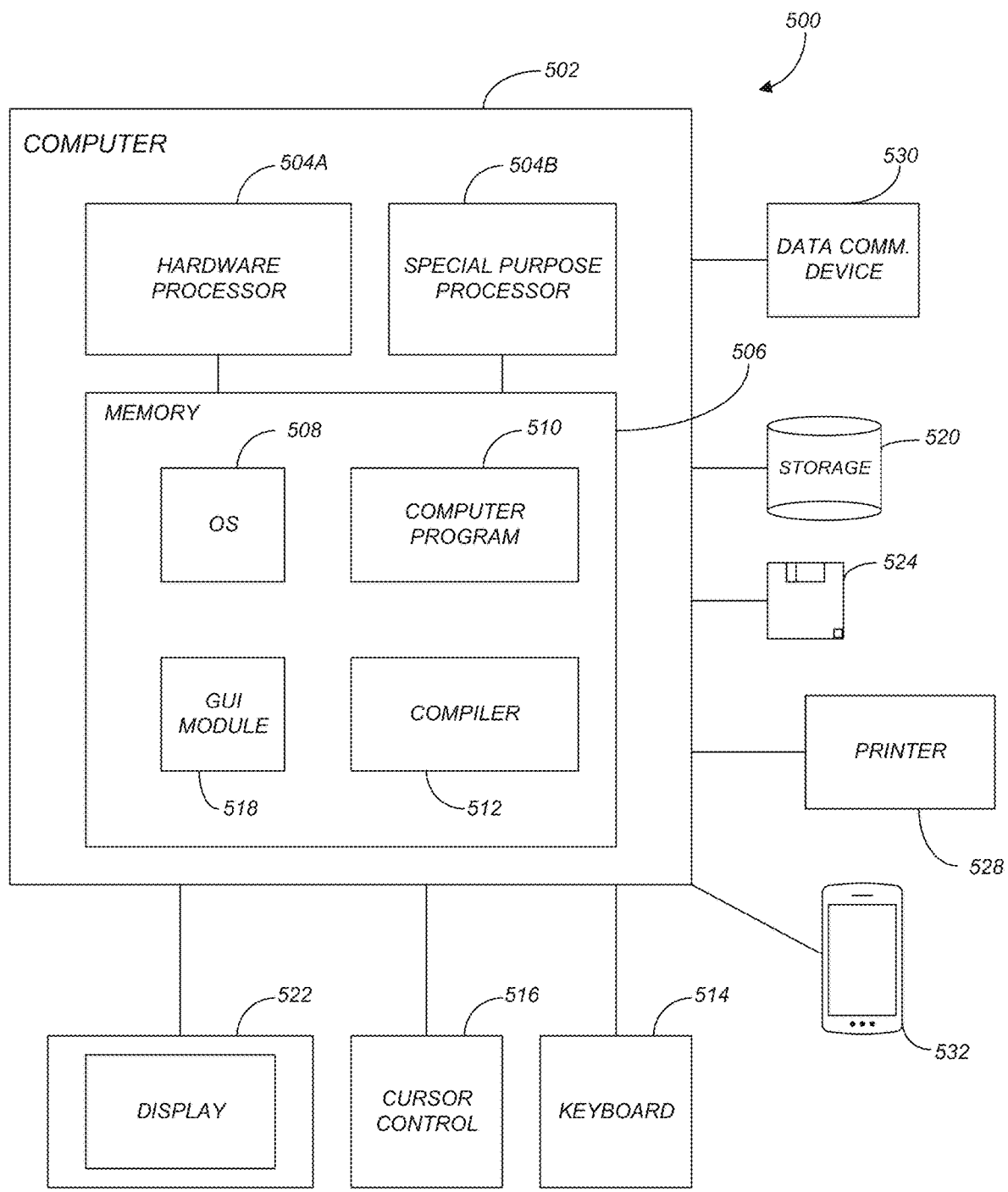
FIG. 5 is an exemplary hardware and software environment used to implement one or more embodiments of the invention.

FIG. 5 is an exemplary hardware and software environment 500 (referred to as a computer-implemented system and/or computer-implemented method) used to implement one or more embodiments of the invention. The hardware and software environment includes a computer 502 and may include peripherals. Computer 502 may be a user/client computer, server computer, or may be a database computer. The computer 502 comprises a hardware processor 504A and/or a special purpose hardware processor 504B (hereinafter alternatively collectively referred to as processor 504) and a memory 506, such as random access memory (RAM). The computer 502 may be coupled to, and/or integrated with, other devices, including input/output (I/O) devices such as a keyboard 514, a cursor control device 516 (e.g., a mouse, a pointing device, pen and tablet, touch screen, multi-touch device, etc.) and a printer 528. In one or more embodiments, computer 502 may be coupled to, or may comprise, a portable or media viewing/listening device 532 (e.g., an MP3 player, IPOD, NOOK, portable digital video player, cellular device, personal digital assistant, etc.). In yet another embodiment, the computer 502 may comprise a multi-touch device, mobile phone, gaming system, internet enabled television, television set top box, or other internet enabled device executing on various platforms and operating systems.

In one embodiment, the computer 502 operates by the hardware processor 504A performing instructions defined by the computer program 510 (e.g., a computer-aided design [CAD] application) under control of an operating system 508. The computer program 510 and/or the operating system 508 may be stored in the memory 506 and may interface with the user and/or other devices to accept input and commands and, based on such input and commands and the instructions defined by the computer program 510 and operating system 508, to provide output and results.

Output/results may be presented on the display 522 or provided to another device for presentation or further processing or action. In one embodiment, the display 522 comprises a liquid crystal display (LCD) having a plurality of separately addressable liquid crystals. Alternatively, the display 522 may comprise a light emitting diode (LED) display having clusters of red, green and blue diodes driven together to form full-color pixels. Each liquid crystal or pixel of the display 522 changes to an opaque or translucent state to form a part of the image on the display in response to the data or information generated by the processor 504 from the application of the instructions of the computer program 510 and/or operating system 508 to the input and commands. The image may be provided through a graphical user interface (GUI) module 518. Although the GUI module 518 is depicted as a separate module, the instructions performing the GUI functions can be resident or distributed in the operating system 508, the computer program 510, or implemented with special purpose memory and processors.

In one or more embodiments, the display 522 is integrated with/into the computer 502 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 502 according to the computer program 510 instructions may be implemented in a special purpose processor 504B. In this embodiment, some or all of the computer program 510 instructions may be implemented via firmware instructions stored in a read only memory (ROM), a programmable read only memory (PROM) or flash memory within the special purpose processor 504B or in memory 506. The special purpose processor 504B may also be hardwired through circuit design to perform some or all of the operations to implement the present invention. Further, the special purpose processor 504B may be a hybrid processor, which includes dedicated circuitry for performing a subset of functions, and other circuits for performing more general functions such as responding to computer program 510 instructions. In one embodiment, the special purpose processor 504B is an application specific integrated circuit (ASIC).

The computer 502 may also implement a compiler 512 that allows an application or computer program 510 written in a programming language such as C, C++, Assembly, SQL, PYTHON, PROLOG, MATLAB, RUBY, RAILS, HASKELL, or other language to be translated into processor 504 readable code. Alternatively, the compiler 512 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 510 accesses and manipulates data accepted from I/O devices and stored in the memory 506 of the computer 502 using the relationships and logic that were generated using the compiler 512.

The computer 502 also optionally comprises an external communication device such as a modem, satellite link, Ethernet card, or other device for accepting input from, and providing output to, other computers 502.

In one embodiment, instructions implementing the operating system 508, the computer program 510, and the compiler 512 are tangibly embodied in a non-transitory computer-readable medium, e.g., data storage device 520, which could include one or more fixed or removable data storage devices, such as a zip drive, floppy disc drive 524, hard drive, CD-ROM drive, tape drive, etc. Further, the operating system 508 and the computer program 510 are comprised of computer program 510 instructions which, when accessed, read and executed by the computer 502, cause the computer 502 to perform the steps necessary to implement and/or use the present invention or to load the program of instructions into a memory 506, thus creating a special purpose data structure causing the computer 502 to operate as a specially programmed computer executing the method steps described herein. Computer program 510 and/or operating instructions may also be tangibly embodied in memory 506 and/or data communications devices 530, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 502.

Figure 6:
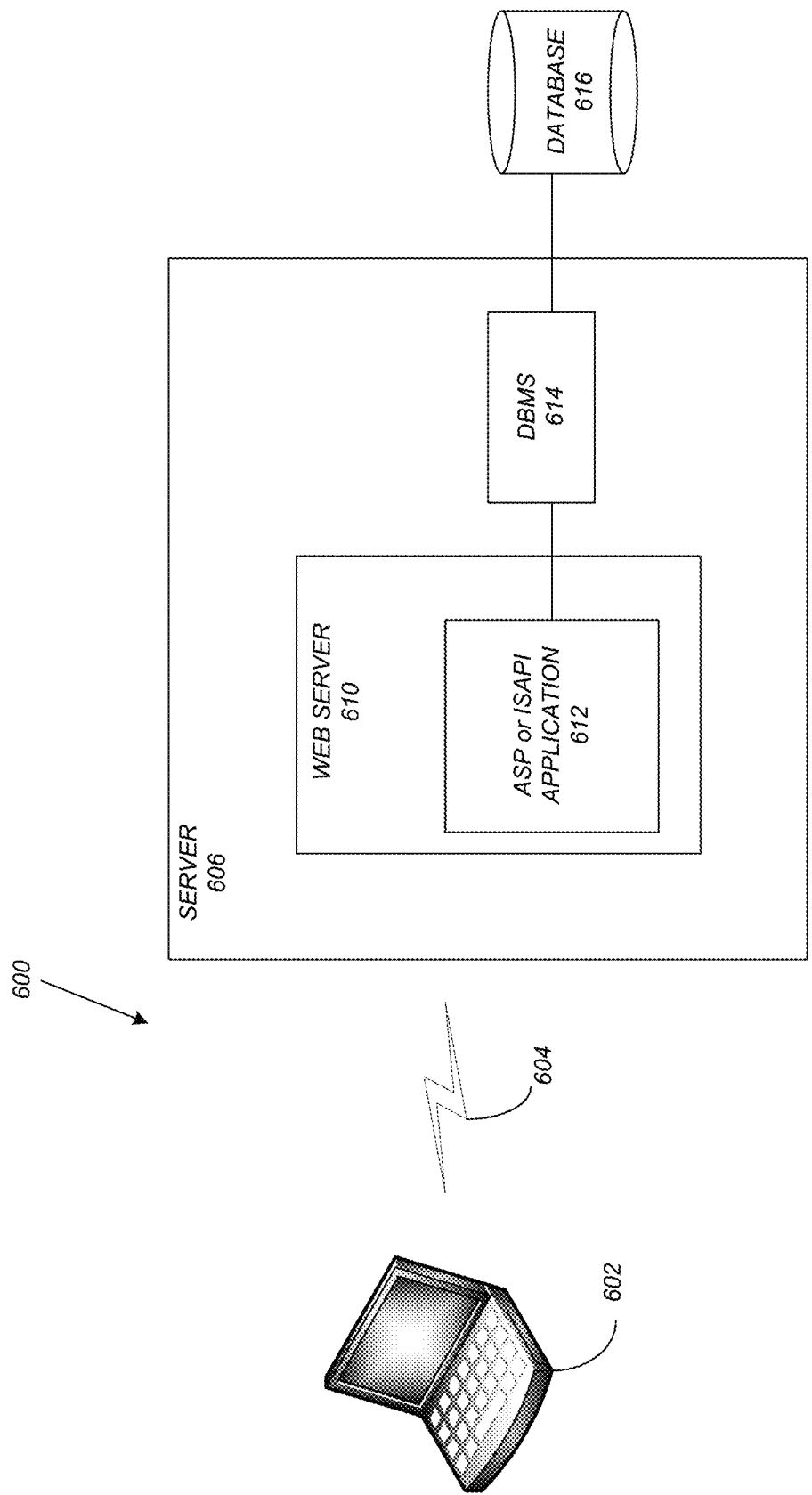
FIG. 6 schematically illustrates a typical distributed/cloud-based computer system using a network to connect client computers to server computers in accordance with one or more embodiments of the invention.

FIG. 6 schematically illustrates a typical distributed/cloud-based computer system 600 using a network 604 to connect client computers 602 to server computers 606. A typical combination of resources may include a network 604 comprising the Internet, LANs (local area networks), WANs (wide area networks), SNA (systems network architecture) networks, or the like, clients 602 that are personal computers or workstations (as set forth in FIG. 5), and servers 606 that are personal computers, workstations, minicomputers, or mainframes (as set forth in FIG. 5). However, it may be noted that different networks such as a cellular network (e.g., GSM [global system for mobile communications] or otherwise), a satellite based network, or any other type of network may be used to connect clients 602 and servers 606 in accordance with embodiments of the invention.

A network 604 such as the Internet connects clients 602 to server computers 606. Network 604 may utilize ethernet, coaxial cable, wireless communications, radio frequency (RF), etc. to connect and provide the communication between clients 602 and servers 606. Further, in a cloud-based computing system, resources (e.g., storage, processors, applications, memory, infrastructure, etc.) in clients 602 and server computers 606 may be shared by clients 602, server computers 606, and users across one or more networks. Resources may be shared by multiple users and can be dynamically reallocated per demand. In this regard, cloud computing may be referred to as a model for enabling access to a shared pool of configurable computing resources.

Clients 602 may execute a client application or web browser and communicate with server computers 606 executing web servers 610. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 602 may be downloaded from server computer 606 to client computers 602 and installed as a plug-in or ACTIVEX control of a web browser. Accordingly, clients 602 may utilize ACTIVEX components/component object model (COM) or distributed COM (DCOM) components to provide a user interface on a display of client 602. The web server 610 is typically a program such as MICROSOFT'S INTERNET INFORMATION SERVER.

Web server 610 may host an Active Server Page (ASP) or Internet Server Application Programming Interface (ISAPI) application 612, which may be executing scripts. The scripts invoke objects that execute business logic (referred to as business objects). The business objects then manipulate data in database 616 through a database management system (DBMS) 614. Alternatively, database 616 may be part of, or connected directly to, client 602 instead of communicating/obtaining the information from database 616 across network 604. When a developer encapsulates the business functionality into objects, the system may be referred to as a component object model (COM) system. Accordingly, the scripts executing on web server 610 (and/or application 612) invoke COM objects that implement the business logic. Further, server 606 may utilize MICROSOFT'S TRANSACTION SERVER (MTS) to access required data stored in database 616 via an interface such as ADO (Active Data Objects), OLE DB (Object Linking and Embedding DataBase), or ODBC (Open DataBase Connectivity).

Generally, these components 600-616 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 602 and 606 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 602 and 606. Embodiments of the invention are implemented as a software/CAD/modeling application on a client 602 or server computer 606. Further, as described above, the client 602 or server computer 606 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for propagating object connections, comprising:
 (a) acquiring a three-dimensional (3D) model comprising 3D object components;
 (b) selecting two or more of the 3D object components as input elements;
 (c) defining a connection between the input elements;
 (d) selecting the connection;
 (e) autonomously collecting data from the selected connection, wherein the data is autonomously collected without any additional user input and the data comprises:
  (i) a number of the input elements;
  (ii) a section type of the input elements; and
  (iii) a relative geometrical position between the input elements;
 (f) autonomously creating a rule based on the data, wherein the rule identifies the number of input elements, the section type of the input elements, and the relative geometric position between the input elements; and (g) propagating the connection to other 3D objects in the 3D model by:
   (i) autonomously searching the 3D model based on the rule to identify one or more other instances of the input elements comprising other 3D object components that are consistent with the data; and
   (ii) autonomously creating, in the 3D model at the identified one or more other instances, the connection between the identified other 3D object components.

2. The computer-implemented method of claim 1, wherein the relative geometrical position comprises:
a connection location zone.

3. The computer-implemented method of claim 1, wherein the relative geometrical position comprises:
a flange/web position.

4. The computer-implemented method of claim 1, wherein the relative geometrical position comprises:
an angle between the input elements.

5. The computer-implemented method of claim 1, wherein the relative geometrical position comprises:
an alignment of the input elements.

6. The computer-implemented method of claim 1, wherein the data further comprises:
a structural type of each of the input elements, wherein the structural type comprises a model role of each of the input elements.

7. The computer-implemented method of claim 6, wherein the structural data type is selected from a group consisting of a beam and a column.

8. The computer-implemented method of claim 1, wherein searching the 3D model comprises searching only elements visible in a current view of the 3D model.

9. The computer-implemented method of claim 1, wherein creating the connection further comprises:
autonomously grouping all of the identified one or more other instances into a group;
changing a parameter of one of the instances in the group;
based on the changed parameter, autonomously propagating the changed parameter to all of the instances in the group.

10. The computer-implemented method of claim 1, wherein creating the connection further comprises:
autonomously identifying a master instance of the identified one or more instances;
autonomously identifying one or more slave instances of the identified one or more instances, wherein the slave instances are slaves of the master instance;
changing a parameter of the master instance;
autonomously propagating the changed parameter to the one or more slave instances.

11. A computer-implemented system for propagating object connections comprising
(a) a computer having a memory;
(b) a processor executing on the computer; and
(c) the memory storing a set of instructions, wherein the set of instructions, when executed by the processor cause the processor to:
   (i) acquire a three-dimensional (3D) model comprising 3D object components;
   (ii) select two or more of the 3D object components as input elements;
   (iii) define a connection between the input elements;
   (iv) select the connection;
   (v) autonomously collect data from the selected connection, wherein the data is autonomously collected without any additional user input and the data comprises:
      (A) a number of the input elements;
      (B) a section type of the input elements; and
      (C) a relative geometrical position between the input elements;
   (vi) autonomously create a rule based on the data, wherein the rule identifies the number of input elements, the section type of the input elements, and the relative geometric position between the input elements; and
   (vii) propagating the connection to other 3D objects in the 3D model by:
      (A) autonomously search the 3D model based on the rule to identify one or more other instances of the input elements comprising other 3D object components that are consistent with the data; and
      (B) autonomously create, in the 3D model at the identified one or more other instances, the connection between the identified other 3D object components.

12. The computer-implemented system of claim 11, wherein the relative geometrical position comprises:
a connection location zone.

13. The computer-implemented system of claim 11, wherein the relative geometrical position comprises:
a flange/web position.

14. The computer-implemented system of claim 11, wherein the relative geometrical position comprises:
an angle between the input elements.

15. The computer-implemented system of claim 11, wherein the relative geometrical position comprises:
an alignment of the input elements.

16. The computer-implemented system of claim 11, wherein the data further comprises:
a structural type of each of the input elements, wherein the structural type comprises a model role of each of the input elements.

17. The computer-implemented system of claim 16, wherein the structural data type is selected from a group consisting of a beam and a column.

18. The computer-implemented system of claim 11, wherein the processor searching the 3D model comprises searching only elements visible in a current view of the 3D model.

19. The computer-implemented system of claim 11, wherein the processor creates the connection by further:
autonomously grouping all of the identified one or more other instances into a group;
changing a parameter of one of the instances in the group;
based on the changed parameter, autonomously propagating the changed parameter to all of the instances in the group.

20. The computer-implemented system of claim 11, wherein the processor creates the connection by further:
autonomously identifying a master instance of the identified one or more instances;
autonomously identifying one or more slave instances of the identified one or more instances, wherein the slave instances are slaves of the master instance;
changing a parameter of the master instance;
autonomously propagating the changed parameter to the one or more slave instances.

* * * * *